INVENTOR.
HAROLD J. OSTERHOF
THOMAS H. ROGERS, JR.

ATTORNEY

Patented Sept. 25, 1951

2,568,866

UNITED STATES PATENT OFFICE 2,568,866

FROTHED RUBBER SPONGE CONTAINING FIBERS

Harold J. Osterhof and Thomas H. Rogers, Jr., Akron, Ohio, assignors to Wingfoot Corporation, Akron, Ohio, a corporation of Delaware Application December 4, 1948, Serial No. 63,588

8 Claims. (Cl. 260—2.5)

This invention relates to an improved frothed rubber latex sponge and to the method of preparation.

Frothed sponge rubber is produced by converting rubber latex into a foam, shaping the foam, coagulating the foamed latex as by gelling and curing the gelled latex.

An important use of frothed sponge rubber is as a cushioning material, the cushioning properties of sponge rubber being dependent upon its ability to be compressed. The compression resistance of sponge rubber is a function of its density. Since the materials cost of the finished sponge depends on the cost of the rubber, compounding ingredients, and other materials that enter into the final product, it is desirable to replace a percentage of these materials with a rubber-latex-substitute which will produce a sponge having a lower density for the same compression resistance as is possessed by sponge made from rubber latex without the addition of a rubber latex substitute hereinafter referred to as the control.

A sponge rubber latex substitute has now been discovered which permits a more economical production of sponge rubber and yet having all the properties possessed by the control and having other desirable properties not possessed by the control. This sponge rubber latex substitute is a fibrous material of the type known as cotton linters. The invention will be described hereinafter with reference to cotton linters but the description will apply equally as well to other fibrous materials.

Figure 1:
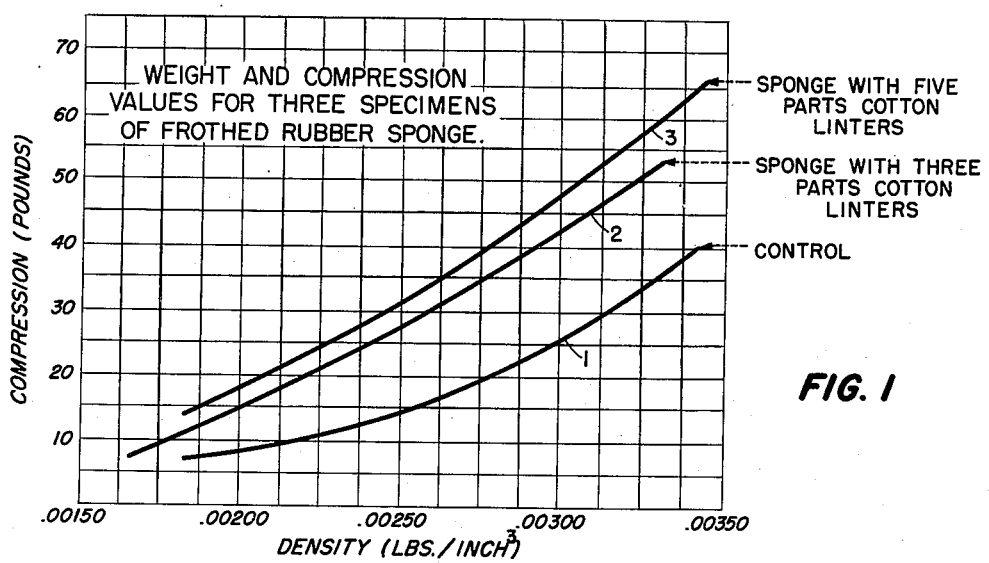

The addition of cotton linters to latex in the production of frothed rubber sponge produces exceptional savings in sponge rubber ingredients when considered in terms of weight per pound of compression developed by the sponge. Savings in sponge rubber ingredients as high as 28% have been realized when only three parts to five parts of cotton linters have been added per 100 parts of rubber. A sponge can be made using as high as 28% less sponge rubber ingredients and therefore have a lower weight compression resistance ratio than the control. This exceptional result is more fully appreciated by referring to the chart of Fig. 1 in the drawing. Curve 1 shows the relationship of values between density in pounds per cubic inch and compression in pounds for the control. A similar relationship of values is shown for the sponge containing 3 parts of cotton linters, values for which are represented by curve 2, and for the sponge containing 5 parts of cotton linters, values for which are represented by curve 3.

Figure 2:
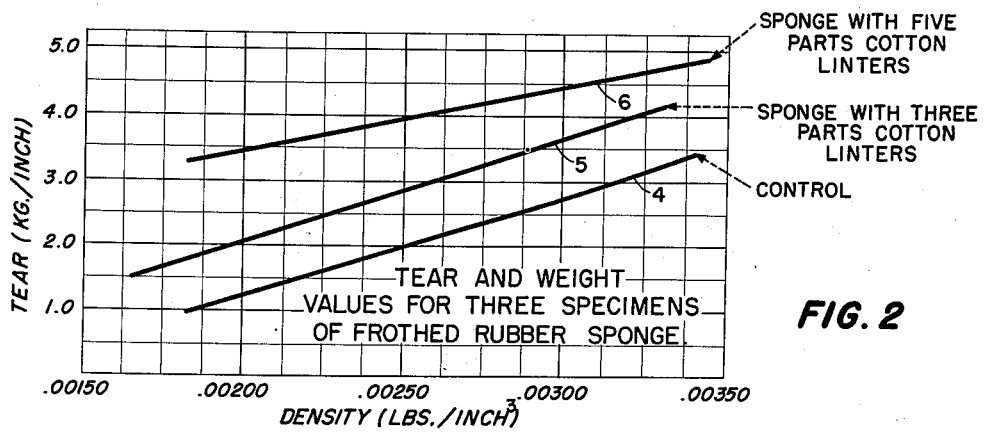

In addition to the saving in sponge rubber ingredients achieved by the use of cotton linters, a three-dimensional reinforcing phenomenon is also observed. This three-dimensional reinforcement is particularly noticeable with respect to the ability of the sponge rubber to resist tearing in any of its three dimensions. This ability to resist tearing is increased by as much as 200% over the control. This improved resistance to tear is more fully appreciated by referring to the chart of Fig. 2 in the drawing. Curve 4 shows a comparison of values between the density in pounds per cubic inch and the tear resistance in kilograms per inch of the control. A similar relationship of values is shown for the sponge containing 3 parts of cotton linters, values for which are represented by line 5, and for the sponge containing 5 parts of cotton linters, values for which are represented by line 6.

Another important discovery in the use of cotton linters in the production of frothed rubber sponge is the reduction in the tendency for the sponge to shrink during gelation and during vulcanization. This shrinkage can be controlled to a certain extent by adjusting the amount of soaps added for frothing, and by adjusting the amount of the gelation agents added. However, even when these controls are exercised, natural rubber latex frothed sponge shrinks between 35 and 40%. Synthetic rubber latex sponge, as for example neoprene (chlorobutadiene-1,3 polymer), shrinks between 45 and 50%. This shrinkage factor is undesirable especially when it is more economical to use the same mold for more than one type of latex. The same mold therefore may not be used for all types of latices unless each type of latex can be adjusted in some manner to a common shrinkage factor. By the use of the present invention, a greater control of the shrinkage factor is obtained. Reductions in shrinkage up to 50% have been realized. For example, a control sponge shrinking as much as 22% will shrink only 11% when 5 parts of cotton linters per 100 parts of rubber are added.

A sponge possessing the desirable properties of lower weight per pound compression, three-dimensional reinforcement, and reduced shrinkage may be produced by the addition of a very small percentage of cotton linters. The amount that may be added ranges from 1% to 10% and preferably from 3% to 5% based on the weight of the rubber. The addition of more than 10% of cotton linters increases the viscosity of the latex froth to such a high value that it becomes extremely difficult to pour into a mold. In fact, frothed latex containing more than 10% cotton linters is so viscous that it must be scooped from the frothing bowl and pressed into the mold. Furthermore, frothed latex sponge made from latex containing more than 10% cotton linters is a stiff, boardy product having little if any of the qualities possessed by the control. However, where this difficulty of pourability and the undesirable characteristics of stiffness and boardiness of the sponge product is not a limiting factor, then amounts greater than 10% of cotton linters may be used. However, in the production of standard qualities of frothed latex sponge rubber, it is preferred to use between 3 parts and 5 parts of cotton linters per 100 parts of rubber.

Figure 3:
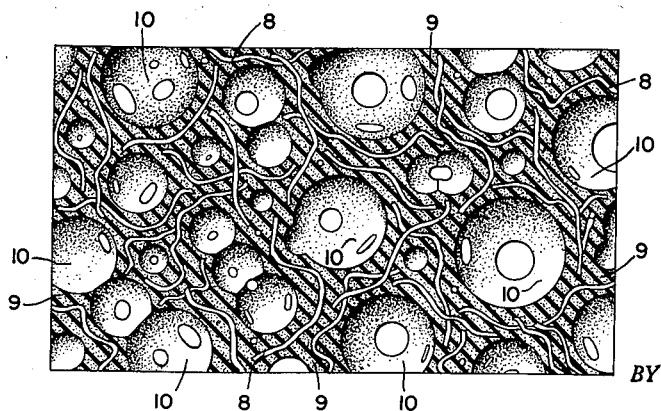

In producing the frothed latex sponge of this invention, it is particularly important that the cotton linters be contained within the wall structure of the sponge and not extend across the cells. This arrangement of cotton linters within the wall structure of the sponge is dependent upon the wettability factor of the fibers being added. If the fibers are difficult to wet, they may be added at the beginning of the frothing period. If the fibers are easily wetted they are added near the end of the frothing period. Cotton linters therefore may be added to the latex before, during, or after frothing depending on their ability to be wetted. It has been observed that it is preferred to add the commercially obtained cotton linters to the latex after it has been frothed from 50% to 75% of the desired volume. The manner of distribution of the cotton linters in the wall structure of the sponge is shown in Fig. 3 of the drawing. Fig. 3 is an enlarged three-dimensional view of a cross-section of frothed sponge. The cotton linters 8 are dispersed at random throughout the wall structure 9 which wall structure forms the sponge cells or voids 10. These cells may range in size from .0004 of an inch diameter up to .5 of an inch. This size range is considered that of a frothed rubber sponge of good utility. Sizes larger than 0.5 of an inch are considered blow holes and occur as large as 1.5 of an inch in factory produced goods. Cells as large as 1/16" and 1/8" are common but the average cell size is considerably smaller approaching 1/80". When the cotton linters are added in this manner between 95 and 100% of the cotton linters are contained within the wall structure 9. Fig. 3 shows that 100% of the cotton linters are contained within the wall structure 9. Occasionally, when 100% of the fibers are not contained within the wall structure of the sponge, it is generally an end of a fiber that will extend into a cell and on these occasions, the fiber end never extends across the cell but into the cell for a distance of not more than about 1/4 of its diameter.

In addition to insuring the distribution of the cotton linters within the wall structure of the sponge when adding the linters to the latex as described, an unexpected saving in rubber is also obtained. When cotton linters are added to the latex before frothing, a saving in rubber of about 10 to 20% is observed, but when the cotton linters are added to latex after it has been frothed between 50% and 75% of the desired volume, a saving in rubber of 28% is obtained. These results were secured when using only 3% cotton linters.

In producing the frothed latex sponge of this invention, it is also particularly important that the cotton linters be within a certain fiber length range. The ideal length can be concluded to be between such a short length that the fiber is acting merely as a coarse filler and such a long length that the fiber cannot be dispersed in the latex during frothing. Between these limits, it is desirable to use a fiber length which is not much less than 1/4 of the circumference of the cell in the vicinity of the fiber reinforcing that cell and a fiber length of about four times the circumference of the cell being reinforced. Thus where large cells are involved, longer fibers are used and where smaller cells are being reinforced, shorter fibers are used.

As a practical matter, the production of cotton linters of a uniform fiber length is practically impossible. However, it is not necessary that the linters be all of the same fiber length because the sponge cells vary in diameter. Furthermore a batch of cotton linters used to prepare a satisfactory sponge material in accordance with the present invention had the following values for fiber length as determined by investigation under a microscope.

Table I

| Range [1] | Group Average Fibre Length | Per cent of fibers within the range |
| --- | --- | --- |
|  | Millimeters | Per cent |
| 0–5 | 0.0409 | 11.5 |
| 6–10 | 0.1308 | 15.0 |
| 11–15 | 0.2125 | 15.0 |
| 16–20 | 0.2943 | 11.5 |
| 21–25 | 0.3750 | 7.0 |
| 26–30 | 0.4568 | 6.0 |
| 31–35 | 0.5395 | 5.5 |
| 36–40 | 0.6213 | 6.0 |
| 41–60 | 0.8256 | 11.0 |
| 61–80 | 0.9445 | 5.0 |
| 81–100 | 1.4715 | 3.5 |
| 101–120 | 1.7985 | 1.5 |
| 121–140 | 2.1255 | 1.0 |
| 141–160 | 2.4525 | 0.5 |

[1] The range indicates the divisions of the eye piece scale of the microscope and one division equals 0.01635 mm.

From the above data showing the fiber length distribution, the average fiber length is 0.46 mm., the median fiber length is 0.30 mm., and is that fiber which is the 50th fiber (counting 100 fibers) when counting the fibers if they were arranged with the shorter fibers first and the longer fibers last. The longest fiber is 2.45 mm. and the shortest fiber length 0.02 mm. It was observed that 20 of the longest fibers contained as much material as 80 of the shortest fibers. When the fiber length is greater than about four times the circumference of an average cell of the particular sponge being produced, there is a tendency for the fibers to collect on the stirring mechanism used in frothing the latex. Thus, longer fibers may be used if a different type of mechanical frothing mechanism is used or if the frothing can be accomplished without the aid of a mechanical device.

A microscopic analysis of the sponge material of this invention shows that the cotton fibers do not extend across the open cells but lie in the wall structure of the sponge. Some of the longer fibers extend along the wall structure of several cells. The fibers extend at random throughout the wall structure in each of the three dimensions of the sponge. In most cases, each fiber interconnects at least two adjacent cells, and many fibers interconnect more than two cells as shown in Fig. 3 of the drawing.

Further, in producing the frothed latex sponge of this invention, it is important that the cotton linters possess an ability to be dispersed properly in the latex and have a certain wettability factor. The dispersibility and wettability of the cotton fibers are interrelated functions with the slowest wetting fibers being the most easily dispersed. Proper dispersion of the fibers in the latex is dependent upon the even distribution of the fibers throughout the latex during frothing. Fibers that do not disperse properly are those that tend to ball up or gather into a single clump or several single clumps. This balling up, or clumping of fibers, does not produce the sponge of this invention. Fibers that disperse properly possess a certain minimum wetting time value depending upon the nature of the fibers being used and the medium in which they are being used. For cotton linters, the wetting time may range from about 30 minutes to more than 24 hours as determined by taking one gram of cotton fibers being tested and spreading them evenly over the surface of a 10% solution of sodium hydroxide in a Petri dish and recording the time required for the sample to become entirely wet, the exposed surface of the Petri dish being 14.9 cms.². It is observed that the longer it takes to wet the fibers, the more evenly are the fibers distributed throughout the latex. In order to increase the wetting time of the fibers, an antiwetting agent may be applied such as a wax or oil. The longer it takes to wet the linters, the more possible is it to add the linters nearer the beginning of the frothing operation. But in any respect an improvement in weight per pound of compression is observed when the linters are added after the latex has been frothed from 50% to 75% of the desired volume.

The new improved sponge-like compositions are made by methods very similar to the methods now in use for making sponge-like compositions. The natural latex, synthetic rubber latex, or mixtures of natural and synthetic rubber latices are prepared with sufficient quantities of stabilizing agents for the purpose of retaining the rubber particles in suspension throughout the compounding operations. Natural rubber latex is customarily stabilized by the addition of ammonia or alkali metal hydroxides, while the synthetic rubber latices are usually stabilized by any one of a wide variety of organic chemicals which have both strongly hydrophilic and strongly hydrophobic radicals. A wide variety of these compounds is known and is available commercially, for example, potassium oleate soap, rosin soaps, sodium stearate, potassium lauryl sulfate, sulfonated hydrocarbons, and sodium alkyl naphthalene sulfate.

The stable latex is frequently compounded with a thickening agent, such as casein, gum tragacanth, or water glass. Conventional antioxidants, such as phenyl-beta-naphthylamine, di-beta-naphthyl-para-phenylene diamine, and the heptyl-diphenylamines, and conventional accelerators such as the zinc salt of mercaptobenzothiazole, benzo-thiazyl disulfide, zinc diethyldithiocarbamate and tetramethylthiuram disulfide are then added. Other modifying agents which may be used optionally are castor oil, which improves the elastic properties of the sponge, carbon blacks which are loading agents, magnesium oxide and calcium silicate which strengthen or stiffen the sponge, and various dyes and coloring matters for improving the appearance of the composition.

The compounded latex prepared in accordance with the preceding paragraph is foamed by rapid agitation and after the mixture has been foamed to 50 to 75% of its desired volume, the fibers such as cotton linters are added to the partially foamed latex, and then the foaming is continued to the desired volume. The foamed composition is gelled in the conventional manner by adding a gelling agent such as sodium fluosilicate, ammonium sulfate, ammonium nitrate, calcium sulfate, and/or 2-nitro-2-methyl-1-propinol. After the gelling agent is added, the composition is poured into a suitable mold and permitted to gel. The weak gel is vulcanized by heating between 160° F. and 400° F. for a sufficient period of time to completely cure the composition.

The sponge-like composition prepared in accordance with this invention may be used in an identical manner to those in the prior art and is particularly useful in the fabrication of household furniture and automobile seats.

In each of the 17 examples enumerated in the table of examples below, the frothed latex sponge made and tested was prepared in substantially the same manner in which the sponge of Example 10 was prepared. The preparation of the sponge in Example 10 is set forth in detail as follows:

*Example 10*

A commercial synthetic rubber latex (59.8% total solids) of a copolymer of 70% of butadiene-1,3 and 30% styrene was used to prepare a sponge rubber composition, by mixing 102 parts of dry rubber weight of said synthetic latex with 98 parts by dry rubber weight of a natural rubber latex containing 62 to 68% rubber solids. The blended latex was mixed with the following compounding agents in conventional dispersions.

| | Parts by dry weight |
|---|---|
| Potassium oleate soap | 2.4 |
| Zinc diethyldithiocarbamate | 2.2 |
| Zinc salt of mercaptobenzothiazole | 3.0 |
| Sulfur | 4.5 |
| Sym-di-beta-naphthyl-p-phenylene diamine | 2.0 |

A quantity of the above latex (394 parts by weight) was mixed with 3 parts by weight of an aqueous solution of potassium oleate, 2 parts by weight of a 20 percent aqueous ammonium sulfate solution, and 1 part by weight of a 20 percent aqueous potassium hydroxide solution.

5 parts of cotton linters corresponding to the length distribution set forth in Table I above were added, after the latex had been frothed to approximately 70% of its final volume. After the cotton linters were added, the mixture was frothed to the desired density and then 12 parts by weight of 50% zinc oxide dispersion and 20 parts by weight of an aqueous dispersion of 20% sodium silicofluoride was added and the latex then poured into a mold and after gelation occurred, was heated for 15 minutes at 15 lbs. steam pressure. The sponge rubber composition obtained was dried by heating at 160° F. and possessed the properties set forth for Example 10 in the table below:

| Example | Parts, Linters/ 100 Rubber | Density, #/in.³ | Compression, lbs. | Wt., Lbs. | Wt., Lbs./ Compress. Lbs.* | Tear, Kg./ Inch | Shrinkage, Per Cent |
|---|---|---|---|---|---|---|---|
| 1 | 0 | .00340 | 40.00 | 2.04 | .051 | 2.55 | 21.5 |
| 2 | 0 | .00182 | 7.00 | 1.16 | .166 | 1.00 | 16.8 |
| 3 | 0 | .00213 | 10.00 | 1.32 | .132 | 1.35 | 18.9 |
| 4 | 0 | .00289 | 28.50 | 1.78 | .0624 | 2.20 | 19.5 |
| 5 | 0 | .00295 | 31.00 | 1.84 | .0593 | 4.00 | 18.3 |
| 6 | 0 | .00262 | 18.25 | 1.62 | .0888 | 2.10 | 19.1 |
| Av | | | 22.46 | | .09325 | 2.54 | 19.016 |
| 7 | 5 | .00264 | 33.00 | 1.76 | .0533 | | 13.0 |
| 8 | 5 | .00182 | 14.00 | 1.21 | .0864 | 3.20 | 13.0 |
| 9 | 5 | .00208 | 21.50 | 1.41 | .0655 | 3.35 | 11.5 |
| 10 | 5 | .00344 | 66.00 | 2.32 | .0352 | 4.90 | 11.9 |
| 11 | 5 | .00218 | 22.00 | 1.46 | .0664 | 4.50 | 12.3 |
| Av | | | 31.30 | | .06136 | 4.0125 | 10.35 |
| 12 | 3 | .00330 | 53.25 | 2.12 | .040 | 4.70 | 16.0 |
| 13 | 3 | .00194 | 12.25 | 1.26 | .1069 | 2.35 | 15.0 |
| 14 | 3 | .00246 | 27.25 | 1.65 | .0604 | 3.60 | 12.2 |
| 15 | 3 | .00252 | 27.50 | 1.66 | .0603 | 3.10 | 15.0 |
| 16 | 3 | .00264 | 32.00 | 1.74 | .0543 | 3.20 | 14.9 |
| 17 | 3 | .00236 | 23.50 | 1.56 | .0664 | 2.70 | 14.9 |
| Av | | | 29.29 | | .06445 | 3.275 | 14.66 |

¹ The amount of rubber stock needed to develop one pound of compression.

In each of the foregoing examples, the compression value was obtained by determining the weight in pounds necessary to compress a circular area of 50 square inches of sponge to 75% of its original thickness. The tear value was obtained by cutting a one inch wide sample of sponge ¼ of an inch thick and determining the force in pounds necessary to complete the tear. This was determined by use of a vertical Scott test machine.

The shrinkage value was determined by a comparison between the volume of the mold and the volume of the finished sponge removed from the mold after vulcanization and drying.

Any rubber latex may be used in producing the sponge rubber of this invention. The expression "rubber latex" is intended to include natural rubber latex, as well as those of polychloroprene and the rubbery butadiene-styrene and butadiene-acrylonitrile copolymers and mixtures of natural and synthetic rubber latices. It is preferred, however, to use natural rubber latex and mixtures of latices containing natural rubber latex in forming the sponge on this invention.

Cotton linters are preferred as the fibrous material to be added to the latex in the preparation of the sponge. In this invention, however, other fibrous materials having characteristics similar to cotton linters may be used. These other fibrous materials include rayon fibers, wool fibers, and other synthetic fibrous material such as nylon, and the fibrous produced from vinyl chloride resins. It is to be understood that cotton linters are the preferred fibrous material, producing the maximum results with respect to three-dimensional reinforcement, percent saving in sponge rubber ingredients, and reduction of shrinkage. Other fibrous materials may be used but lack some of the advantages produced by cotton linters.

When wool fibers are used, there is a further advantage observed in that the sponge is resistant to combustion. When 5% of wool fibers are added to the rubber latex, the resulting sponge passes the cigarette burning test in which the lighted end of a cigarette is placed against the surface of the sponge. The presence of wool fibers tends to seal off the area that is being subjected to combustion and prevents spreading of the destructive forces of combustion.

Spun glass may also be used as a fibrous material but because of its smooth surface, there is a tendency for the fibers to pull loose from the walls of the sponge. The same objection is noticed with respect to other smooth surface fibrous materials such as nylon. This difficulty may be overcome, however, by treating these smooth surfaces with an adhesive composition which forms a bond between the sponge rubber and the fiber.

While certain representative embodiments and details have been shown for the purpose of illustrating the invention, it will be apparent to those skilled in this art that various changes and modifications may be made therein without departing from the spirit or scope of the invention.

We claim:

1. In a method of making vulcanized rubber sponge from rubber latex, the steps comprising adding to at least 25% partially frothed rubber latex one part to 10 parts per 100 parts of rubber in the latex of cotton linters having an average fiber length of about 0.46 mm. and having a wetting time of at least 30 minutes determined by taking one gram of the cotton linters and spreading them evenly over the surface of a 10% solution of sodium hydroxide and noting the time required for the linters to become entirely wet, further frothing the latex to the final volume, gelling and then vulcanizing the gelled latex.

2. In a method of making vulcanized rubber sponge from a rubber latex selected from at least one member of the group consisting of natural rubber, polychloroprene, butadiene-styrene copolymers, and butadiene-acrylonitrile copolymers, the steps comprising adding to at least 25% partially frothed rubber latex one part to 10 parts per 100 parts of rubber in the latex of cotton linters having an average fiber length of about 0.46 mm. and having a wetting time of at least 30 minutes determined by taking one gram of the linters and spreading them evenly over the surface of a solution of 10% sodium hydroxide and noting the time required for the linters to become entirely wet, further frothing the latex to the final volume, gelling and then vulcanizing the gelled latex.

3. In a method of making vulcanized rubber sponge from a rubber latex selected from at least one member of the group consisting of natural rubber, polychloroprene, butadiene-styrene copolymers, and butadiene-acrylonitrile copolymers, the steps comprising partially frothing the rubber latex to from 50% to 75% of the final volume, adding to the partially frothed rubber latex one part to 10 parts per 100 parts of rubber in the latex of cotton linters having an average fiber length of about 0.46 mm. and having a wetting time of at least 30 minutes determined by taking one gram of the linters and spreading them evenly over the surface of a solution of 10% sodium hydroxide and noting the time required for the linters to become entirely wet, further frothing the latex to the final volume, gelling and then vulcanizing the gelled latex.

4. In a method of making vulcanized rubber sponge from a rubber latex selected from at least one member of the group consisting of natural rubber, polychloroprene, butadiene-styrene copolymers, and butadiene-acrylonitrile copolymers, the steps comprising adding to at least 25% partially frothed rubber latex 3 parts to 5 parts per 100 parts of rubber in the latex of cotton linters having an average fiber length of about 0.46 mm. and having a wetting time of at least 30 minutes determined by taking one gram of the linters and spreading them evenly over the surface of a solution of 10% sodium hydroxide and noting the time required for the linters to become entirely wet, further frothing the latex to the final volume, gelling and then vulcanizing the gelled latex.

5. In the method of making vulcanized rubber sponge from a mixture of natural rubber latex and a rubbery butadiene-1,3-styrene copolymer latex, the steps comprising partially frothing the mixture of rubber latex to from 25% to 75% of the final volume, adding to the frothed latex 3 parts to 5 parts per 100 parts of rubber in the latex of cotton linters having an average fiber length of about 0.46 mm. and having a wetting time of at least 30 minutes determined by taking one gram of the linters and spreading them evenly over the surface of a 10% solution of sodium hydroxide and noting the time required for the linters to become entirely wet, further frothing the latex to the final volume, gelling and vulcanizing the gelled latex.

6. A sponge of vulcanized frothed rubber latex prepared by adding to at least 25% partially frothed rubber latex one part to 10 parts per 100 parts of rubber in the latex of cotton linters having an average fiber length of about 0.46 mm. and having a wetting time of at least 30 minutes determined by taking one gram of the cotton linters and spreading them evenly over the surface of a 10% solution of sodium hydroxide and noting the time required for the linters to become entirely wet, further frothing the latex to the final volume, gelling and then vulcanizing the gelled latex.

7. A sponge of vulcanized frothed rubber latex selected from at least one member of the group consisting of natural rubber, polychloroprene, butadiene-styrene copolymers, and butadiene-acrylonitrile copolymers, the sponge being prepared by adding to at least 25% partially frothed rubber latex one part to 10 parts per 100 parts of rubber in the latex of cotton linters having an average fiber length of about 0.46 mm. and having a wetting time of at least 30 minutes determined by taking one gram of the cotton linters and spreading them evenly over the surface of a 10% solution of sodium hydroxide and noting the time required for the linters to become entirely wet, further frothing the latex to the final volume, gelling and then vulcanizing the gelled latex.

8. A sponge of a mixture of vulcanized frothed natural rubber latex and frothed rubber latex of a copolymer of butadiene-1,3 and styrene prepared by adding to at least 25% partially frothed rubber latex one part to 10 parts per 100 parts of rubber in the latex of cotton linters having an average fiber length of about 0.46 mm. and having a wetting time of at least 30 minutes determined by taking one gram of the cotton linters and spreading them evenly over the surface of a 10% solution of sodium hydroxide and noting the time required for the linters to become entirely wet, further frothing the latex to the final volume, gelling and then vulcanizing the gelled latex.

HAROLD J. OSTERHOF.
THOMAS H. ROGERS, Jr.

REFERENCES CITED

The following references are of record in the file of this patent:

UNITED STATES PATENTS

| Number | Name | Date |
|---|---|---|
| 2,043,954 | Kershaw | June 9, 1936 |
| 2,140,062 | Talalay | Dec. 13, 1938 |
| 2,150,178 | Maywald | Mar. 14, 1939 |
| 2,288,686 | Daniels | July 7, 1942 |
| 2,432,971 | Ruthman | Dec. 16, 1947 |
| 2,498,785 | Bennett et al. | Feb. 25, 1950 |